United States Patent

[11] 3,581,520

| [72] | Inventors | August Quesada<br>Arlington;<br>Norman D. Malcosky, Columbus, Ohio |
|---|---|---|
| [21] | Appl. No. | 814,636 |
| [22] | Filed | Apr. 9, 1969 |
| [45] | Patented | June 1, 1971 |
| [73] | Assignee | Columbia Gas System Service Corporation<br>New York, N.Y. |

[54] ABSORPTION REFRIGERATION SYSTEM
9 Claims, 6 Drawing Figs.

[52] U.S. Cl. ............................................. 62/476,
 62/497, 122/156
[51] Int. Cl. ............................................. F25b 15/04
[50] Field of Search ............................................. 62/476,
 495, 497; 122/156; 431/328

[56] References Cited
UNITED STATES PATENTS

| 1,873,390 | 8/1932 | Hainsworth | 62/106 |
| 2,241,621 | 5/1941 | Shoeld | 62/101 |
| 2,290,532 | 7/1942 | Buffington | 62/109 |
| 2,315,364 | 3/1943 | Coons | 62/141 |
| 2,337,870 | 12/1943 | Coons | 62/101 |
| 3,187,798 | 6/1965 | Pokorny | 431/264 |
| 3,279,213 | 10/1966 | Sonntag, Jr. | 62/497 |

Primary Examiner—Martin P. Schwadron
Assistant Examiner—P. D. Ferguson
Attorney—Curtis, Morris & Safford ABSTRACT: An absorption refrigeration system having a gas-fired, infrared radiant heater, a compact single-unit combined generator, analyzer and rectifier. The unit is formed by concentric cylindrical shells closed at the top and bottom to form an annular space therebetween with the inner wall defining the annular space surrounding the radiant burner. The lower section of the annular space constitutes the generator; the intermediate section contains the analyzer and an associated heat exchanger; and the upper section contains the rectifier. The interior wall of the generator section is uniformly heated by the radiant burner, and the products of combustion also heat the exterior wall of the generator.

PATENTED JUN 1 1971

INVENTORS
AUGUST QUESADA
NORMAN D. MALCOSKY

BY Curtis, Morris & Safford

ATTORNEYS

INVENTORS
AUGUST QUESADA
NORMAN D. MALCOSKY
BY
Curtis, Morris & Safford
ATTORNEYS

INVENTORS
AUGUST QUESADA
NORMAN D. MALCOSKY

ABSORPTION REFRIGERATION SYSTEM

The present invention relates to absorption refrigeration and more particularly to improvements in a combined generator-analyzer-rectifier unit for such systems.

Absorption refrigeration systems are well known in the art and comprise a generator, a condenser, an evaporator and an absorber interconnected to provide paths of flow for the refrigerant and the absorbent. The solution of refrigerant and absorbent in the generator is heated to expel refrigerant vapor therefrom. The expelled vapor is then delivered to the condenser where it is condensed to a liquid by transfer of its heat of vaporization to an ambient medium at a lower temperature. The liquid refrigerant from the condenser is delivered to the evaporator where it evaporates at a relatively low pressure. The evaporation of refrigerant at the low pressure and temperature produces the refrigerating effect.

The relatively hot absorbent from which the refrigerant has been expelled in the generator (absorbent weak in refrigerant) is then cooled and delivered to the absorber. The cool absorbent weak in refrigerant in the absorber has a high affinity for refrigerant vapor and absorbs vapor from the evaporator in open communication therewith to maintain the relatively low pressure and temperature in the evaporator.

The absorbent into which the refrigerant vapor has been absorbed (solution strong in refrigerant) is then delivered back to the generator by a pump, and the cycle is repeated. Thus, the generator and condenser operate at a relatively high pressure while the evaporator and absorber operate at a relatively low pressure. Restricting means are provided between the high- and low-pressure sides of the system which together with the solution pump maintain the difference in the pressures in the two sides of the system.

The use of heat exchangers, analyzers and rectifiers is well known in absorption refrigeration systems to improve their efficiency. The heat exchange transfers heat between the relatively hot absorbent weak in refrigerant flowing from the generator to the absorber and the relatively cool absorbent strong in refrigerant flowing from the absorber to the generator. The analyzer directly contacts the relatively cool absorbent strong in refrigerant in counterflow with the relatively hot refrigerant vapor flowing from the generator to the condenser to separate liquid absorbent from the expelled refrigerant vapor to improve the quality of the refrigerant vapor entering the condenser. The rectifier transfers heat from the refrigerant vapor exiting the analyzer to a cooler solution in a heat exchanger to further reduce the amount of absorbent in the refrigerant vapor delivered to the condenser and again increase the quality of refrigerant vapor entering the condenser.

One of the objects of the present invention is to provide an improved generator construction in an absorption refrigeration system which provides for radiant heating of an interior surface as well as convection heating of an exterior surface resulting in a heating of solution enclosed between the surfaces.

Another object of the invention is to provide an improved construction in an absorption refrigeration system which combines a generator, analyzer, rectifier, and heat exchangers in a single compact unit.

Still another object of the invention is to provide an improved generator-analyzer-rectifier unit in an absorption refrigeration system which is of relatively simple and compact construction to adapt it for economical manufacture and one which is efficient in operation.

These and other objects will become more apparent from the following description and drawings in which like reference characters denote like parts throughout the several views. It is to be expressly understood, however, that the drawings are for the purpose of illustration only and are not a definition of the limits of the invention, reference being had for this purpose to the appended claims.

Figure 1:
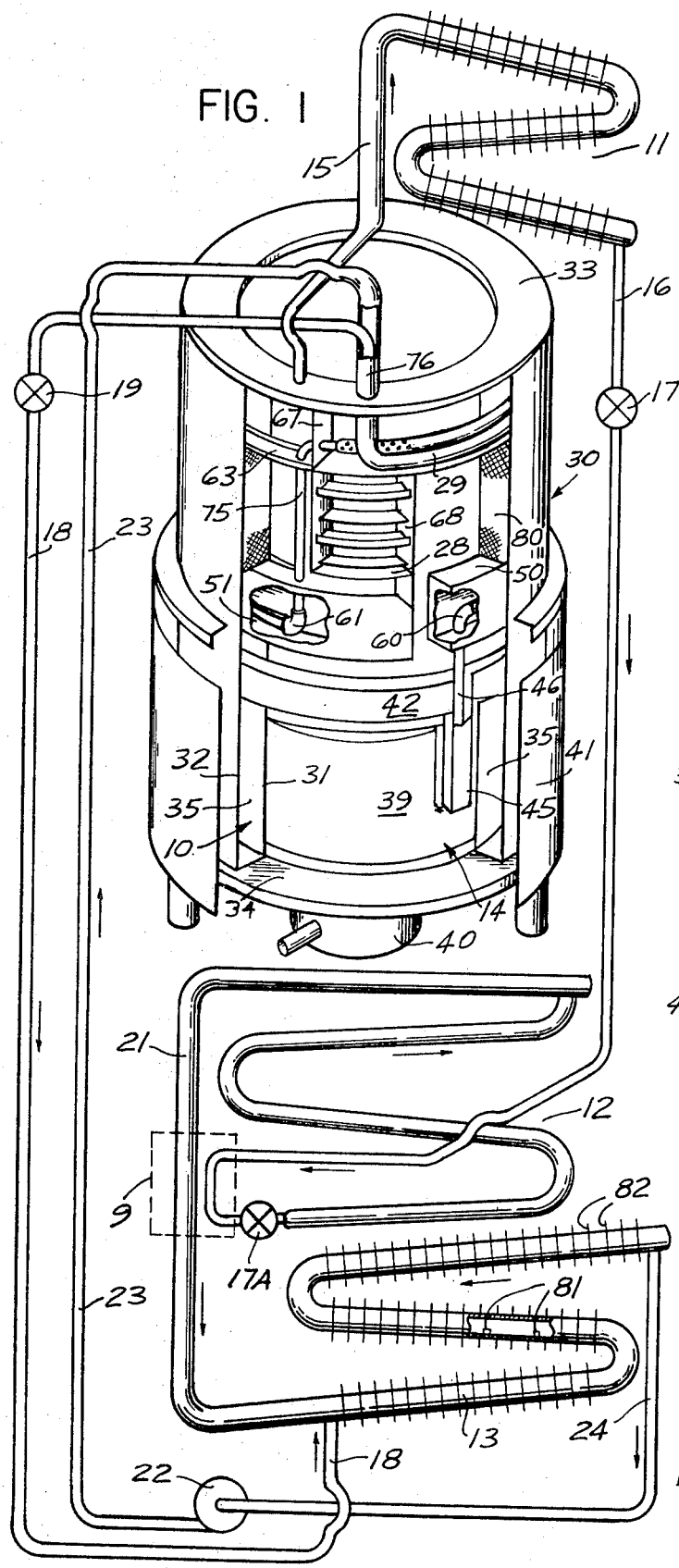
FIG. 1 is a diagrammatic view of an absorption refrigeration system partly in perspective and partly in section to illustrate the generator-analyzer-rectifier unit of the present invention.

An absorption refrigeration system incorporating the novel features of the present invention is shown in FIG. 1 as comprising a generator 10, a condenser 11, an evaporator 12 and an absorber 13 interconnected to provide circuits for the flow of refrigerant and absorbent. Heat is supplied to the generator 10 by heater 14 to expel refrigerant vapor, such an ammonia, from absorbent, such as water. The refrigerant vapor is delivered through a conduit 15 to the condenser 11 which gives off heat to an ambient medium, such as the atmosphere, to condense the refrigerant vapor to a liquid. Liquefied refrigerant then flows through conduit 16 and a restriction 17A therein, such as an expansion valve, to the evaporator 12 for flow therein. The liquefied refrigerant flowing towards the evaporator 12 and the refrigerant vapor flowing towards the absorber 13 pass in exchange heat relationship in a heat exchanger 9 to cool the liquefied refrigerant delivered to the evaporator and to heat the refrigerant vapor delivered to the absorber.

The absorbent weak in refrigerant is delivered from the generator 10 through a conduit 18 to the absorber 13 for flow therethrough. Flow of solution weak in refrigerant is produced by the higher pressure in the generator 10 than in the absorber 13 and a restriction 19 in conduit 18 limits the rate of flow.

The absorber 13 receives the absorbent flow through conduit 18 and the refrigerant vapor flow through conduit 21 which flows concurrently therethrough and the exit is through conduit 24. Refrigerant vapor is absorbed in the absorbent in absorber 13 at a vapor pressure corresponding to the temperature and concentration of the absorbent therein and thereby produces the same low vapor pressure in the evaporator 12 which is in open communication therewith through conduit 21. This low vapor pressure in the evaporator 12 causes the liquid refrigerant to vaporize at a low temperature and produce a cooling effect in the evaporator 12. The absorbent flowing concurrently with refrigerant vapor in the absorber 13 becomes progressively stronger in refrigerant due to the absorption process. This said process produces heat which is dissipated to an ambient medium, such as the atmosphere, for example by an exhaust fan 100, see FIG. 6.

Solution strong in refrigerant is then withdrawn from a conduit 24 which is in communication with absorber 13 and pumped by a pump 22 through a conduit 23 back to the generator 10 to complete the cycle. As thus far described, the absorption refrigeration system is of conventional form.

In accordance with the present invention the generator 10 has an improved construction to provide for both radiant and convection heating of the solution therein. Also the generator 10 is combined with an analyzer 28 and a rectifier 29 to provide a self-contained unit 30 of novel construction.

Figure 3:
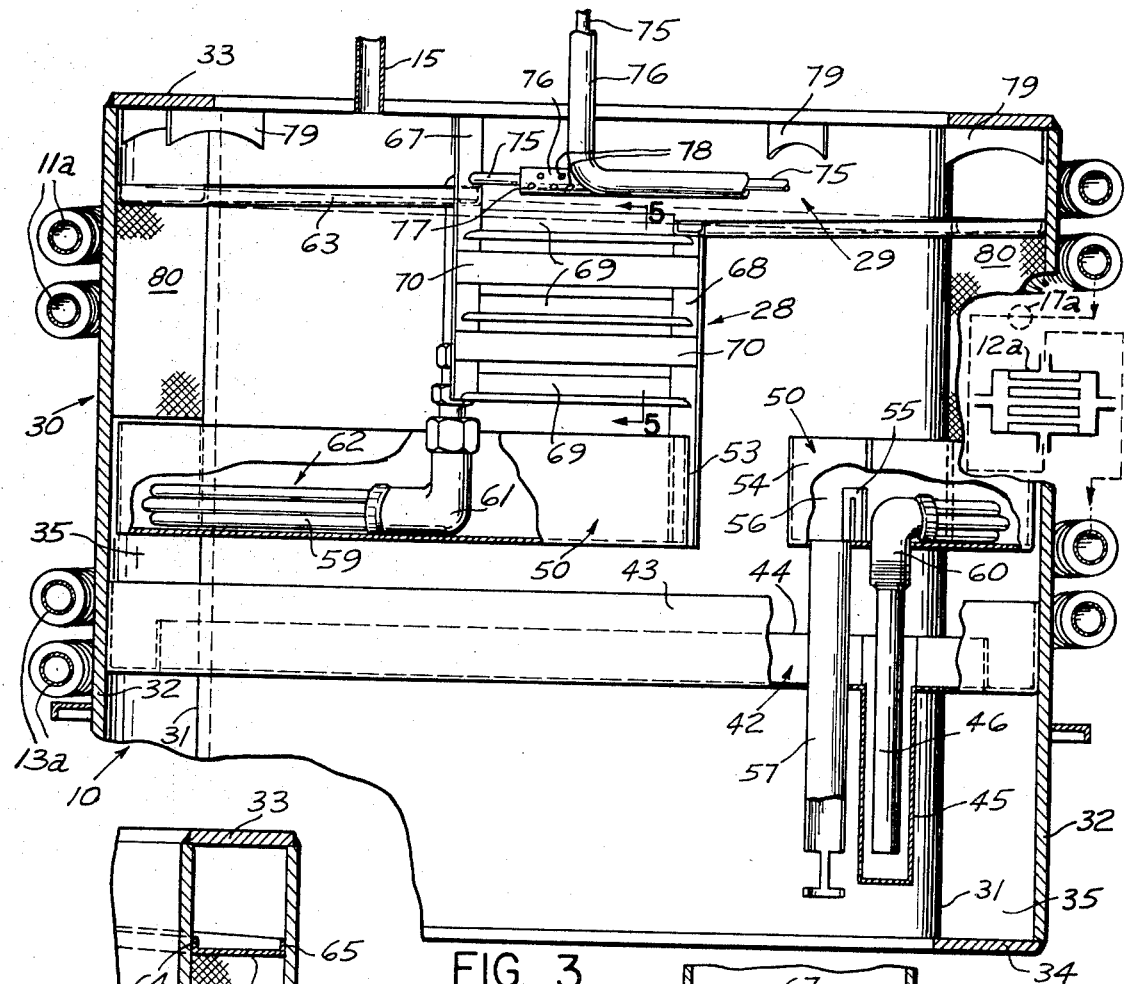
FIG. 3 is an enlarged view partly in section of the generator-analyzer-rectifier unit of FIG. 1 with the burner and deflector removed to show the relationship of the elements in more detail and illustrating a commercial embodiment in which the condenser and absorber surround the unit.
Figure 4:
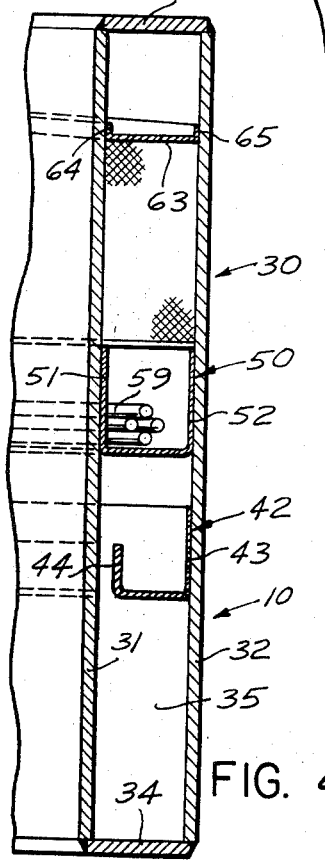
FIG. 4 is a sectional view through one side of the unit to show the annular space between inner and outer shells and the relationship of the troughs and trays in the annular space.
Figure 5:
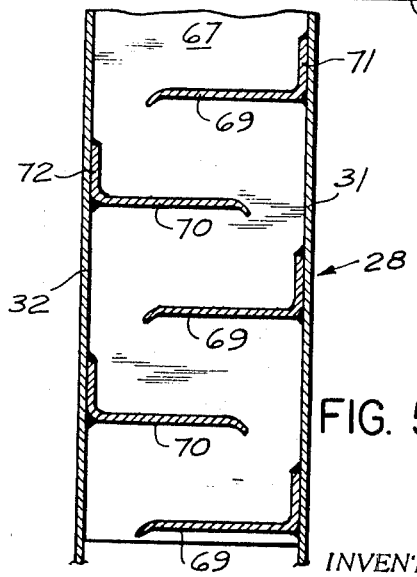
FIG. 5 is a sectional view taken on line 5-5 of FIG. 3 to show the overlapping trays of the analyzer projecting radially from the inner and outer shells in alternate arrangement.

The unit 30 comprises inner and outer cylindrical shells 31 and 32, see FIGS. 1 and 3, closed by upper and lower annular plates 33 and 34 to provide a vessel constituting the generator 10. The annular space in an intermediate section of the vessel contains the analyzer 28 and the annular space in the upper section of the vessel contains the rectifier 29.

The lower generator section 10 of the annular unit 30 surrounds the radiant heater 14. In the illustrated embodiment the radiant heater 14 is shown as a cylindrical perforated wall 39 of suitable material which may be heated by a burner 40 to incandescence thereby to radiate infrared rays. It is to be understood, however, that the radiant heater 14 may take other shapes and forms than the cylindrical form shown. The products of combustion from the burner 40, after heating the radiant wall 39, are directed downwardly around the lower end plate 34 of the annular unit 30 and then upwardly to the outer periphery of the generator which is surrounded by a skirt 41 to additionally heat this surface of the generator by convection.

Positioned in the annular space 35 between the inner and outer shells 31 and 32 is a collection trough 42 into which absorbent weak in refrigerant overflows from the generator 10 for delivery to the absorber 13. The trough 42 is U-shaped having an outer flange 43 adjacent to the inside surface of the outer shell and an inner flange 44 of less height than flange 43 adjacent to the outside surface of the inner shell 31. Depending from an opening in the bottom of the trough 42 is a closed well 45 extending to a position adjacent to the bottom of the annular space 35 (see FIG. 3). Thus, solution weak in refrigerant will continuously overflow into the collection trough 42 and then into the well 45 during operation of the system. An outlet pipe 46 extends downwardly to a position adjacent the bottom of the well 45 where the absorbent weak in refrigerant collects by gravity.

Located in the annular space 35 of the unit 30 above the collection trough 42 is a reservoir trough 50. Trough 50 is similar to trough 42 in that it is U-shaped in cross section and has an inner flange 51 adjacent to the outside surface of the inner shell 31 and an outer flange 52 adjacent to the inner surface of the outer shell 32. Both flanges 51 and 52 of the trough 50 are of equal height, and the trough is of less length than the periphery of the annular space 35 to leave a space between its ends. The ends of the annular trough 50 are closed by end plates 53 and 54 and a short wall 55 projects upwardly from the bottom wall of the trough adjacent the plate 54 to provide a dam or weir over which liquid may flow into a chamber 56. A supply pipe 57 depends from the bottom of the chamber 56 to a position adjacent the bottom of the annular space 35 to deliver absorbent strong in refrigerant to the bottom of the generator.

Figure 2:
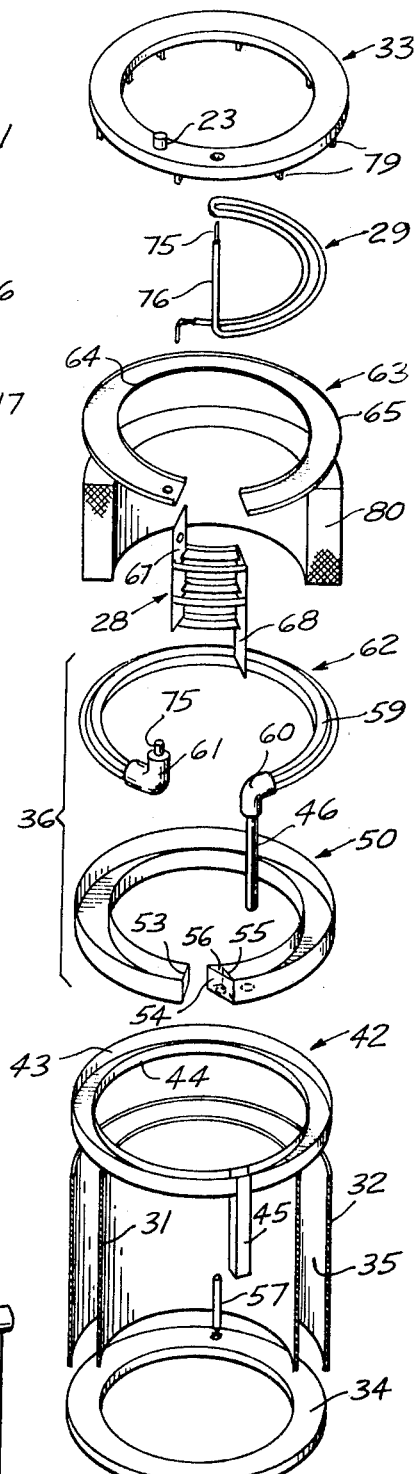
FIG. 2 is an exploded view of the parts of the self-contained unit illustrated in FIG. 1 and showing their relationship to each other.

Located in the reservoir trough 50 are a cluster of tubes 59 of the same general curvature as the trough (see FIG. 2 as well). Tubes 59 extend between headers 60 and 61 and in conjunction with the trough form a heat exchanger 36. Outlet pipe 46 extends upwardly from well 45 in the collection trough 42 through the bottom of the reservoir trough 50 and is connected to the header 60 of heat exchanger 36.

Above the reservoir trough 50 is an annular septum plate 63 having right-angular flanges 64 and 65 at its edges attached and sealed to the outside face of the inner shell 31 and inside face of the outer shell 32, respectively. The septum 63 is of generally spiral shape (see FIG. 3) and projects from a higher level at the left-hand end to a lower level at the right-hand end and along which absorbent strong in refrigerant flows downwardly to the analyzer. The septum 63 is of less length than the periphery of the annular space 35 to provide an open area between its ends in which the analyzer 28 is located. End plates 67 and 68 extend between the inner and outer shells 31 and 32 at the opposite ends of the septum 63. End plate 67 extends from the top plate 33 downwardly across the left-hand end of the septum 63 as viewed in FIG. 3 to a level slightly above the reservoir trough 50. End plate 68, on the other hand, is attached and sealed to the right-hand end of the septum 63 and extends downwardly in spaced relation to the end plate 53 of the reservoir tray 50 to a position adjacent the bottom thereon. The outlet pipe 15 for refrigerant vapor overlies the upper end of the helical septum 63 for delivering refrigerant vapor to the condenser 11.

Analyzer 28 comprises a series of plates or trays 69 and 70 attached in spaced alternate arrangement to the inner and outer shells 31 and 32, respectively. The trays 69 and 70 have right-angular flanges 71 or 72 for attaching them to their respective shells and the opposite side edges are attached to end plates 67 and 68 as by welding. The trays 69 and 70 extend horizontally to overlie an underlying tray with a downwardly curved edge to cause solution to flow across each tray and then onto the top of the next lowermost tray from the top to the bottom of the analyzer 28. Solution from the lowermost tray flows into the left-hand end of the reservoir trough 50 for flow therein around the annular space 35 and in a direction countercurrent to the flow of solution weak in refrigerant flowing through the heat exchanger 36.

Rectifier 29 is positioned in the space between the septum 63 and the top cover plate 33 and comprises a heat exchanger of concentric tubes 75 and 76 bent back on itself in a hairpin shape so that it is twisted and curved throughout its length to a contour corresponding to the curvature of the annular space 35. As shown in FIG. 3, the inner tube 75 extends through the end plate 67 of the analyzer 28 and then downwardly with its lower end connected to the header 61 of heat exchanger 36. The outer tube 76 of the rectifier 29 has an open end 77 in the space directly above the analyzer 28. Outer tube 76 also has a series of holes 78 in its side adjacent the open end to provide for the free flow of absorbent strong in refrigerant onto the uppermost analyzer tray 69. Depending from the cover plate 33 in the annular space 35 above the rectifier 29 are baffle plates 79 having curved edges to produce turbulence and a thorough mixing of the refrigerant vapor leaving the analyzer and tending to flow along the rectifier 29.

Between the reservoir trough 50 and septum 63 is a band 80 of insulating material extending between the inner and outer shells 31 and 32 and the end plates 67 and 68 of the analyzer 28. This insulation prevents the transmission of heat between the generator 10 and rectifier 29 so as to cause all heat transfer to occur between the streams of hot absorbent weak in refrigerant flowing from the generator to the absorber and cold absorbent strong in refrigerant flowing from the absorber to the generator. One form of the invention having now been described in detail, the mode of operation is explained below.

To initiate operation of the refrigeration system the burner 40 is ignited to supply products of combustion to the center of the inner shell 31. The products of combustion heat the perforated cylindrical wall of the radiant heater 14 to incandescence, after which the products of combustion flow downwardly around the lower end plate 34 of the annular unit 30 and then upwardly around the periphery of the space and between the skirt 41 and outer periphery of the shell 32. The incandescent cylindrical wall produces infrared heat rays uniformly over the interior of the inner wall 31 of generator 10, while the flow of the products of combustion heat the exterior of the generator by convection.

Heat transmitted to the absorbent strong in refrigerant in the annular space 35 expels refrigerant vapor from the absorbent. The refrigerant vapor flows upwardly between the inner periphery of the trough 42 and inner shell 31 and between the end plate 68 and end 53 of the reservoir trough 50 into the bottom of the analyzer 28. The refrigerant vapor flows in the annular space in the trough 50, exchanging heat with the absorbent strong in refrigerant flowing on the bottom of trough 50. The refrigerant vapor then flows upwardly in a zigzag path between alternate adjacent trays 69 and 70 of the analyzer 28 in a direction countercurrent to the flow of the absorbent strong in refrigerant flowing downwardly through the analyzer which results in the separation of the absorbent from refrigerant vapor and improves the quality of the refrigerant vapor.

The refrigerant vapor then enters the rectifier 29 and flows circumferentially in the annular space formed between shells 32 and 31 and trough 63 and end plate 33 contacting and exchanging heat with the outer surface of conduit 76. The refrigerant vapor passes through the rectifier 29 and more absorbent is condensed out of the refrigerant vapor to further improve the quality of the refrigerant vapor entering the condenser.

In the condenser 11 the refrigerant vapor is condensed to a liquid which flows downwardly through the conduit 16 and restrictors 17 and 17A to evaporator 12. Restrictor 17 provides a preliminary pressure drop, while the major pressure drop is provided by restrictor 17A. This series restrictor arrangement stabilizes the operation and prevents objectionable fluctuations which may occur, for example, during startup. The pressure reduction produced by restrictor 17 is not sufficient to cause evaporation of the refrigerant, and restrictor 17A acts as the sole expansion valve. The liquid refrigerant evaporates in the evaporator 12 at a low pressure and temperature to produce a refrigeration effect, and the vapor formed in the evaporator is delivered through the conduit 21 to the absorber 13.

The absorbent weak in refrigerant accumulates in the annular space 35 of the generator 10 until it overflows the flange 44 of the annular collection trough 42 and into the well 45. This solution is subjected to the higher pressure in the generator which forces it upwardly through the outlet pipe 46, header 60, tubes 59 and header 61 of the heat exchanger 36, inner tube 75 of the rectifier 29, and conduit 18 connecting the rectifier 29 to the absorber 13. Absorbent weak in refrigerant flows through the absorber 13 toward the pump 22 while absorbing refrigerant vapor which flows concurrently with the absorbent through absorber 13. Absorber 13 includes baffles 81 which produce a turbulence in the flow of refrigerant vapor and absorbent to insure an intimate contact therebetween. The absorption of refrigerant vapor in the absorbent produces heat corresponding to the heat of solution which is dissipated from the absorber 13 through fins 82 on the exterior of absorber 13 to an ambient medium such as the atmosphere.

The absorbent strong in refrigerant is delivered by the pump 22 to conduit 23 and enters the annular space between conduits 76 and 75 in rectifier 29. The absorbent strong in refrigerant is then delivered onto the uppermost tray of the analyzer 28. The pump 22 supplies the energy necessary to transfer the absorbent strong in refrigerant from the low-pressure side to the high-pressure side of the system. The solution flows across the alternate overlying trays 69 and 70 of analyzer 28 in intimate contact with the refrigerant vapor flowing upwardly therethrough and at the bottom of the analyzer is delivered to the left-hand end of the reservoir trough 50. The absorbent strong in refrigerant then flows from the left-hand end to the right-hand end of the reservoir trough 50 in further heat exchange with absorbent weak in refrigerant in heat exchanger 36 and refrigerant vapor flowing circumferentially in trough 50 and over the weir plate 55 into the chamber 56. From chamber 56 an absorbent strong in refrigerant flows by gravity through the supply pipe 57 to the bottom of the annular space 35 adjacent the bottom thereof to complete the cycle.

Figure 6:
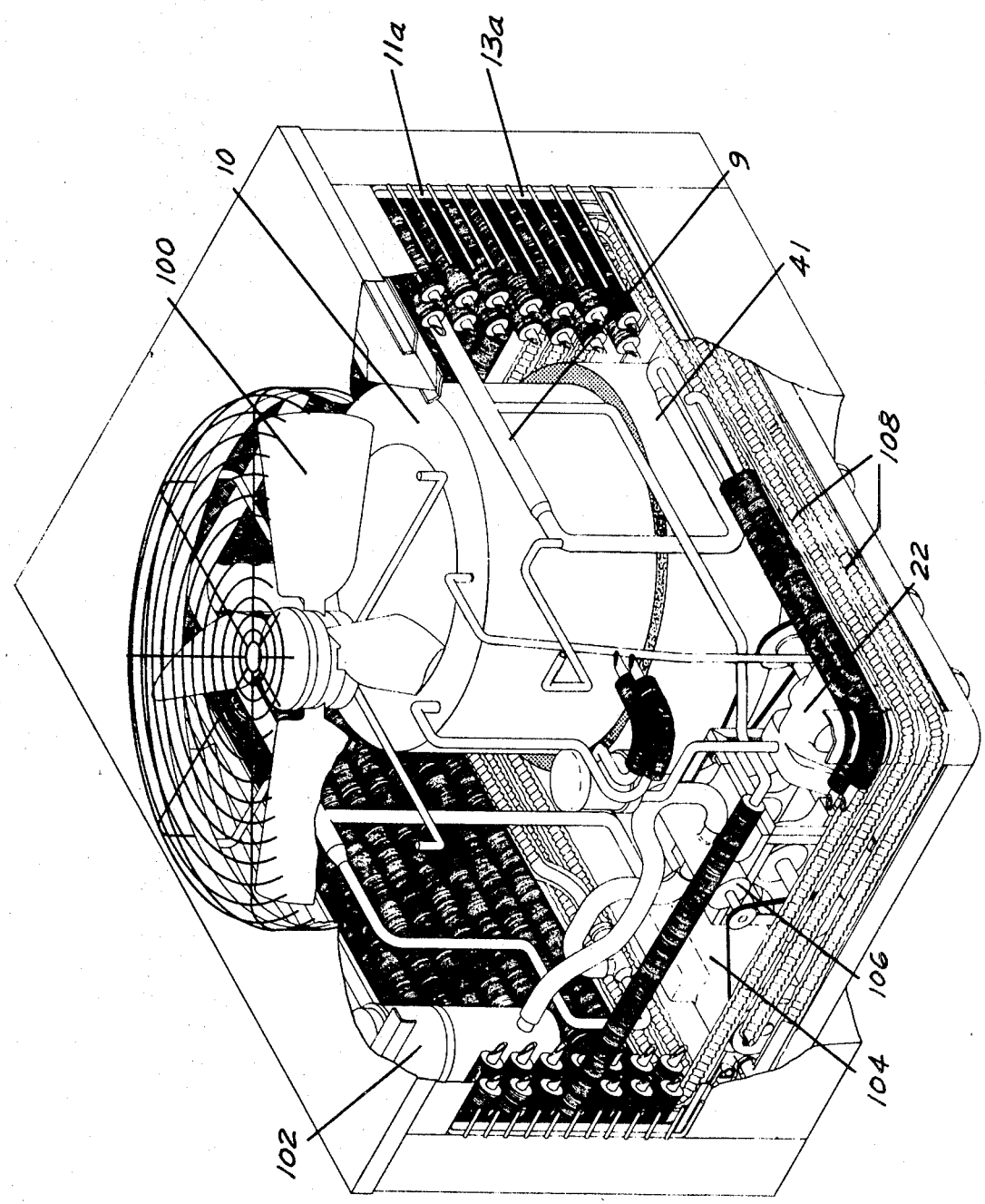
FIG. 6 is a perspective view, partly broken away showing an embodiment of the present invention.

FIG. 3 illustrates substantially the same construction as the combined generator-analyzer-rectifier unit 30 as illustrated in FIG. 1, except for the outer skirt 41 around the generator. FIGS. 3 and 6 further illustrate a commercial arrangement in which the condenser 11a and absorber 13a are in the form of finned coils surrounding the body of the unit 30 and supported thereon. The evaporator 12a of such a construction may constitute a heat exchange device, such as a water chiller, which is located between the condenser 11 and absorber 13 either closely adjacent thereto or remotely therefrom. As seen in FIG. 6, a water reservoir 102 is provided to insure a sufficient supply of water. The chilled water is pumped by water pump 106, driven by a motor 104, through chilled water coils 108 which are connected to heat exchanger devices which may be located wherever cooling is desired.

It will now be observed that the present invention provides an improved generator construction for increasing the heat transfer by heating the interior of the generator by radiant heat simultaneously with the heating of the exterior of the generator by convection. It will also be observed that the present invention provides an improved construction of the generator, analyzer and rectifier in a single compact unit. It will still further be observed that the present invention provides an improved generator-analyzer-rectifier unit in an absorption refrigeration system of relatively simple compact construction adapted for economical manufacture and efficient operation.

While two embodiments of the present invention are herein illustrated and described, it will be understood that further changes may be made in the construction and arrangement of elements without departure from the spirit or scope of the invention. Therefore, without limitation in this respect, the invention is defined by the following claims:

We claim:

1. An absorption refrigeration system comprising a generator, a condenser, an evaporator, an absorber, conduits interconnecting said elements to provide circuits for refrigerant and absorbent, a pump for circulating absorbent, restricting means in the conduits to maintain a difference in pressure between the generator and condenser at a higher pressure and the evaporator and absorber at a lower pressure, said generator comprising a vessel having inner and outer shells forming an annular space therebetween, a radiant heater having a wall adjacent the inner shell of the annular generator vessel, a gas burner for heating the wall of the radiant heater, and a casing surrounding the exterior of the outer wall of the generator for directing products of combustion from the space at the interior or around the outside of the generator; an inlet pipe extending to the bottom of said annular space for supplying absorption solution strong in refrigerant to the generator, a solution-collecting trough in said annular space between the inner and outer shells, said trough being of less width than the spacing between the walls and having a vertical flange, a well depending from the trough, accumulated solution from which refrigerant has been expelled overflowing the vertical flange into the trough and well depending therefrom, and an outlet pipe extending into the depending wall.

2. An absorption refrigeration system in accordance with claim 1 having a reservoir trough in the annular space between the shells and above the solution collection trough, said reservoir trough being of less length than the periphery of the annular space and having closed ends, a heat exchanger in said reservoir trough and connected at one end to the outlet pipe in the collection trough, means for delivering solution strong in refrigerant to one end of the reservoir trough for flow therethrough to the opposite end, a wall in said reservoir trough forming a discharge chamber into which solution flows, and said inlet pipe extending from the bottom of the discharge chamber to a position adjacent the bottom of the annular space.

3. An absorption refrigeration system in accordance with claim 2 having a septum for closing the space between the inner and outer shells above the reservoir trough, said septum being of less length than the periphery of the annular space, spaced end plates between the inner and outer shells of the vessel at the ends of the septum, alternate trays arranged in spaced overlying relation between the inner and outer walls of the vessel and the spaced end plates, and means to supply a solution strong in refrigerant onto the septum plate for flow onto the upper tray and over the successive lower trays and countercurrent to the flow of expelled refrigerant vapor to provide an analyzer.

4. An absorption refrigeration system in accordance with claim 3 in which a rectifier is provided in the annular space above the septum, said rectifier comprising separate pipes in heat exchange relation, one end of one pipe being connected to the outlet end of the heat exchanger in the reservoir trough, one end of the other pipe being in open communication with the top of the analyzer and from which absorbent strong in refrigerant may flow.

5. An absorption refrigeration system comprising a generator, a condenser, an evaporator and absorber, conduits interconnecting the elements to provide circuits for the flow of refrigerant and absorbent, a pump for circulating absorbent in a circuit between the generator and absorber, restricting means in the conduits to maintain a difference in pressure between the generator and condenser operable at a higher pressure and the evaporator and absorber operable at a lower pressure, a unit having inner and outer shells closed at the top and bottom to form an annular vessel, means for heating the lower section of said annular vessel constituting a generator to expel refrigerant vapor from absorbent therein, an analyzer in an intermediate section of the annular vessel, a rectifier in the upper section of said annular vessel, and insulation in an intermediate space between the inner and outer shells of the annular vessel and the sides of the analyzer and between the heater section of the vessel and rectifier.

6. An absorption refrigeration system in accordance with claim 5 in which an annular collection trough is provided in the annular space adjacent the top of the heated section, said collection trough being of less width than the space between the inner and outer shells and having a flange over which solution flows, a well dependent from the collection trough, and an outlet pipe for solution weak in refrigerant extending into the well to a position adjacent the bottom thereof.

7. An absorption refrigeration system in accordance with claim 5 in which an annular reservoir trough is mounted in the annular space above the heated section, said reservoir trough being of less length than the periphery of the annular space and closed at its opposite ends, means for supplying absorbent strong in refrigerant to one end of the reservoir trough to flow toward the opposite end thereof, a wall in the reservoir tray forming a chamber at one end, a pipe depending from the chamber to a position adjacent the bottom of the annular vessel to supply solution strong in refrigerant thereto, and a heat exchanger in the reservoir trough connected to receive solution weak in refrigerant from the heated section of the vessel.

8. An absorption refrigeration system in accordance with claim 5 in which the analyzer comprises a septum plate between the inner and outer walls of the annular space above the heated section, said septum plate being of less length than the periphery of the annular space, transverse end plates extending between the inner and outer shell at opposite ends of the septum plate, respectively, and alternate trays arranged in overlapping relation in the space between the inner and outer shells and end plates, and means for supplying solution strong in refrigerant to the septum plate adjacent one of the end plates for flow into the tray at the top of the opposite end plate whereby the expelled refrigerant vapor and solution strong in refrigerant flow in countercurrent directions in intimate contact with each other.

9. An absorption refrigeration system in accordance with claim 5 in which the rectifier comprises a heat exchanger having concentric pipes, the inner pipe being connected to the lower section of the unit constituting a generator, and the outer pipe of the rectifier having an open end above the analyzer through which absorbent strong in refrigerant flows from the pump towards the generator, and the concentric pipes having a section extending in a generally horizontal direction in the annular vessel to permit refrigerant vapor to flow towards the condenser.